United States Patent
Lu et al.

(10) Patent No.: US 12,493,985 B1
(45) Date of Patent: Dec. 9, 2025

(54) MACHINE VISION BASED INSTALLATION METHOD, SYSTEM, AND STORAGE MEDIUM FOR BUILDING BOARDS

(71) Applicant: Tongji University, Shanghai (CN)

(72) Inventors: Yujie Lu, Shanghai (CN); Xianzhong Zhao, Shanghai (CN); Long Wang, Shanghai (CN); Tao Zhong, Shanghai (CN); Bo Liu, Shanghai (CN); Guanghan Song, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 19/234,316

(22) Filed: Jun. 11, 2025

(30) Foreign Application Priority Data

Jun. 11, 2024 (CN) .......................... 202410743499.9

(51) Int. Cl.
*G06T 7/73* (2017.01)
*G06T 7/13* (2017.01)
*G06T 7/60* (2017.01)

(52) U.S. Cl.
CPC .................. *G06T 7/74* (2017.01); *G06T 7/13* (2017.01); *G06T 7/60* (2013.01)

(58) Field of Classification Search
CPC ................ G06T 7/74; G06T 7/13; G06T 7/60
See application file for complete search history.

(56) References Cited

U.S. PATENT DOCUMENTS 9,200,449 B2 * 12/2015 Oguri .................... B44C 5/04

FOREIGN PATENT DOCUMENTS

| JP | 2005-307455 | * | 11/2005 |
| JP | 2013-167121 | * | 8/2013 |

OTHER PUBLICATIONS

Machine translation for JP 2005-307455 (Year: 2005).*
Machine translation for JP 2013-167121 (Year: 2013).*
Chen et al., "Flatness Measurement of Platform Screen System Welding Assembly Using Stereo Vision and Grid Pattern Projector", IEEE Sensors Journal, vol. 22, No. 1, Jan. 1, 2022 (Year: 2022).*
Lin et al., "Applications of computer vision on tile alignment inspection", Automation in Construction 35 (2013) 562-567 (Year: 2013).*

* cited by examiner

*Primary Examiner* — Qian Yang
(74) *Attorney, Agent, or Firm* — Jose Cherson Weissbrot

(57) ABSTRACT

The present application relates to a machine vision based installation method, system, and storage medium for building boards, and the machine vision based installation method for building boards includes: obtaining a first operation image of a target building board; identifying the first operation image and obtaining feature points of the target building board; obtaining the flatness detection result of target building board based on the feature points; installing building boards based on the flatness detection result and local optimal algorithm.

5 Claims, 5 Drawing Sheets

MACHINE VISION BASED INSTALLATION METHOD, SYSTEM, AND STORAGE MEDIUM FOR BUILDING BOARDS

TECHNICAL FIELD

The present application relates to the technical field of machine vision and building board installation, particularly to a machine vision based installation method, system, and storage medium for building boards.

BACKGROUND

In prior art, building boards (such as galvanized steel plates, aluminum alloy plates, color coated aluminum plates, metal embossed plates, etc.) are usually installed manually. In the installation of high-altitude building boards (such as ceiling color steel plates), scaffolding needs to be erected or high-altitude vehicles need to be used to assist the operation and the installation of larger building boards requires the collaboration of multiple people. There are problems such as low efficiency, long construction period, and poor installation accuracy, which seriously slow down the installation efficiency. In addition, when a large area of building boards needs to be installed, these building boards are prone to unevenness, and it is necessary to frequently review the height and angle of each building board to meet the overall requirements in terms of installation height and large surface levelness.

SUMMARY

Based on this, it is necessary to provide a machine vision based installation method, system, and storage medium for building boards to address the aforementioned technical issues.

In the first aspect, a machine vision based installation method for building boards is provided, and the machine vision based installation method for building boards comprises:
- obtaining a first operation image of a target building board;
- identifying the first operation image and obtaining feature points of the target building board;
- obtaining a flatness detection result of the target building board based on the feature points; and
- installing building boards based on the flatness detection result and a local optimal algorithm.

In the second aspect, a machine vision based installation system for building board is provided, and the installation system for building board comprises:
- an acquisition module, used to obtain a first operation image of a target building board;
- an identification module, used to identify the first operation image and obtain feature points of the target building board;
- a flatness detection module, used to obtain a flatness detection result of the target building board based on the feature points;
- an installation module, used to install building boards based on the flatness detection result and a local optimal algorithm;

In the third aspect, a computer-readable storage medium storing a computer program is provided, and when the computer program is executed by a processor, the steps of the machine vision based installation method for building board described in the first aspect are implemented.

The above machine vision based installation method, system, and storage medium for building boards, and the machine vision based installation method for building boards includes: obtaining a first operation image of a target building board; identifying the first operation image and obtaining feature points of the target building board; obtaining a flatness detection result of the target building board based on the feature points; installing building boards based on the flatness detection result and a local optimal algorithm. The above means enable the successful installation without collaboration of multiple people and based on visual inspection, but instead determining an accurate installation posture through calculation, thereby achieving high efficiency and installation accuracy. In addition, the flatness detection result of target building boards is obtained based on the feature points, the building boards are installed based on the flatness detection result and the local optimal algorithm, free from frequent review of the height and angle of each building board, so that it is easy to level the installation of building boards and meet the overall requirements in terms of installation height and large surface levelness.

DETAILED DESCRIPTION OF THE EMBODIMENTS

In order to make the purpose, technical solution, and advantages of the present application clearer and more understandable, the present application will be further explained in detail in conjunction with the drawings and embodiments below. It should be understood that the specific embodiments described herein are only used to explain and are not intended to limit the present application.

Figure 1:
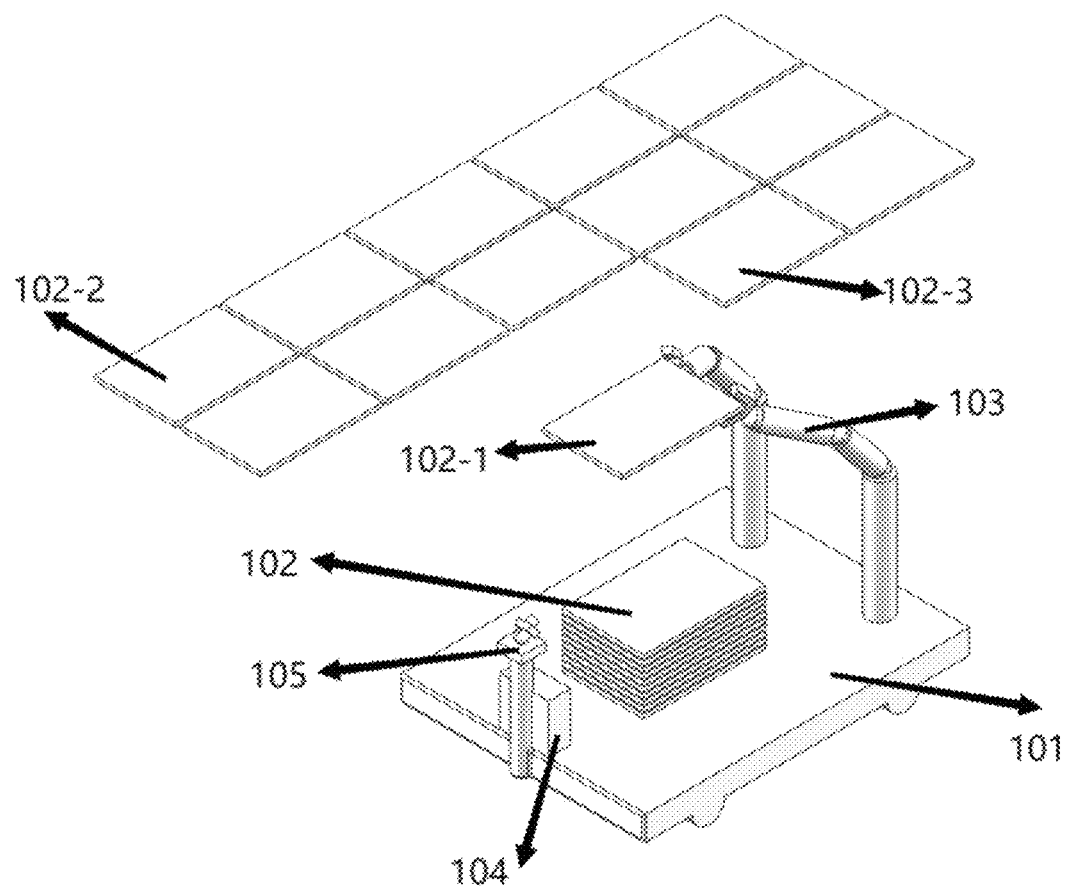
FIG. 1 is a schematic diagram of a building board installation based on machine vision in one embodiment.

In the embodiment of the present invention, as shown in FIG. 1, a building board 102 is placed above the robot chassis moving module 101. The robot installation module (such as a manipulator) 103 holds a piece of building board 102-1 to be installed. A control box 104 is communicatively connected to the robot installation module 103, which has functions such as image recognition, data processing, flatness detection, and control. The camera device 105 captures and acquires the operation images of building boards, and the control box 104 identifies, extracts features, and analyzes the operation images of current newly installed building board 102-2 and other installed building boards 102-3 (excluding 102-2) to determine whether the current newly installed building board 102-2 is installed flatly or not. The control box 104 can also identify, extract features, and analyze the operation images of current newly installed building board 102-2 and other installed building boards 102-3 (excluding 102-2) to determine the installation position of the building board 102-1 to be installed. The control box 104 sends installation instructions to robot installation module 103 which installs the building board 102-1 to be installed.

Figures 2, 3:
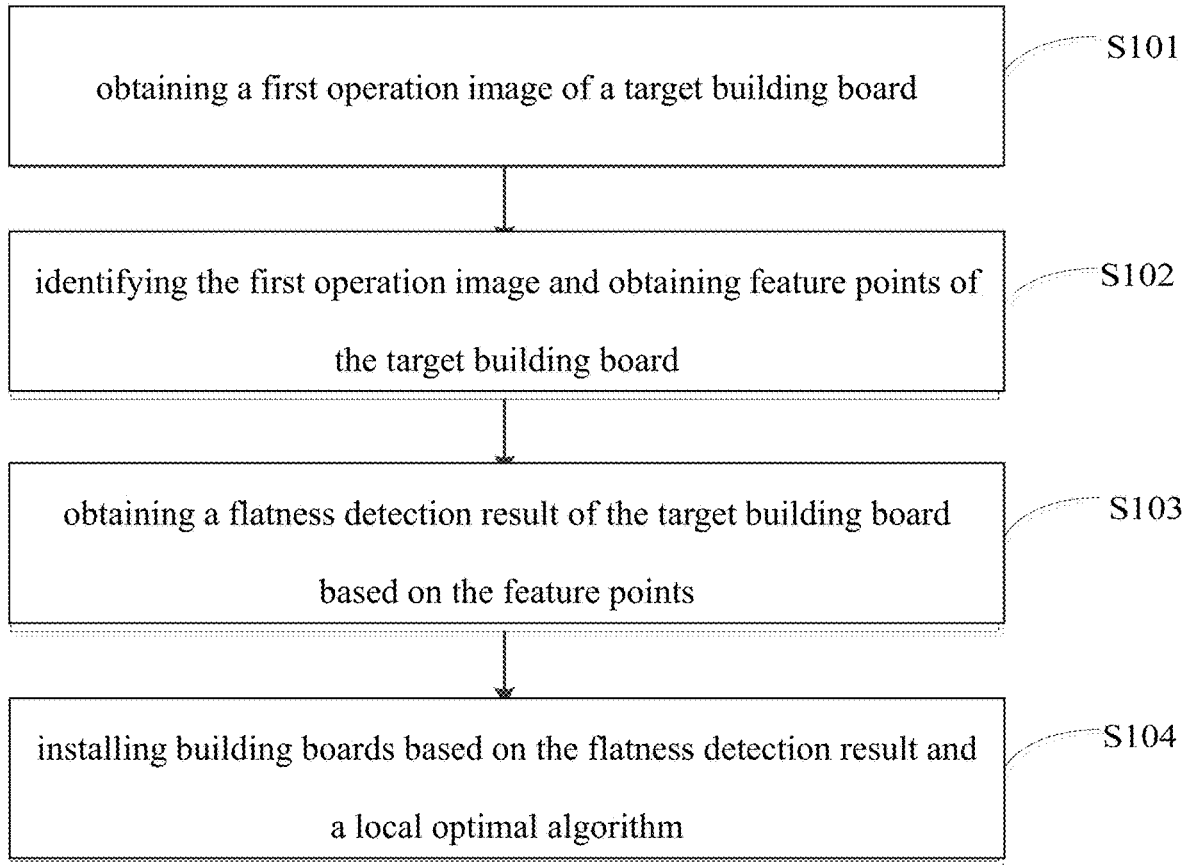
FIG. 2 is a flowchart of a machine vision based installation method for building boards in one embodiment.
FIG. 3 is a schematic diagram of Queen adjacency in one embodiment.

In one embodiment, as shown in FIG. 2, a machine vision based installation method for building boards is provided, and the machine vision based installation method for building boards comprises:

S201: obtaining a first operation image of a target building board.

Wherein the target building board is a current newly installed building board; In the embodiment of the present invention, the first operation image of the target building board is captured by a camera device. Before installation, it is necessary to calibrate the camera device in advance. The first operation image of target building board is obtained by using the calibrated camera device.

Wherein the specific calibration process of camera device is as follows: in the form of "eye-to-hand", the camera device is installed in a fixed position, so that the position relationship between the camera device and the base of building board installation robot (hereinafter referred to as the robot) is fixed. The camera device calibration is completed by using the robot eye-to-hand calibration method, to obtain the transformation relationship matrix between the image coordinate system of camera device and the coordinate system of robot end actuator, thus completing the calibration of camera device.

The camera device may be a depth camera.

Wherein, for the "eye-to-hand" mentioned above, in terms of robotics, refers to the coordination between the robot's visual system (such as camera devices or sensors) and its manipulator (mechanical arm or hand), enabling the robot to perform precise operations based on visual information.

The eye-to-hand method can be the Zhang Zhengyou calibration method.

S202: identifying the first operation image and obtaining feature points of the target building board;

Wherein, the first operation image is processed to obtain the RGB-D image of the first operation image and afterwards, the RGB-D image is preprocessed, such as image denoising, image enhancement, image segmentation, etc., for better identification and detection of building boards in the future.

Optionally, the feature points can be feature points $Q_{1,2,\ldots,n}$ of building board, where n is the total number of feature points. In this embodiment, n=4 is preferred, and the 4 feature points are the four corner points of target building board, respectively, and the feature points can be the coordinates of four corner points $Q_1$, $Q_2$, $Q_3$ and $Q_4$ of building board, or the coordinates of center point O of the building board.

S203: obtaining a flatness detection result of the target building board based on the feature points.

Wherein the flatness detection results include flatness result and non-flatness result;

In the embodiments of the present invention, analyzing the distance and/or angle of target building board based on feature points can determine whether the target building board is flat or non-flat.

S204: installing building boards based on the flatness detection result and a local optimal algorithm.

Wherein the posture or height of the target building board can be adjusted, and/or the next building board can be installed, based on the flatness detection result and local optimal algorithm.

In the embodiments of the present invention, when the target building board is flat, indicating that the installation of the target building board meets the installation requirements and is accurate, and the next building board can be installed based on local optimal algorithm. When the target building board is non-flat, indicating that the installation of the target building board does not meet the installation requirements and is inaccurate, it is therefore necessary to adjust and optimize the posture of target building board based on local optimization algorithm and reinstall the target building board.

The above machine vision based installation method, system, and storage medium for building boards, and the machine vision based installation method for building boards includes: obtaining a first operation image of a target building board; identifying the first operation image and obtaining feature points of the target building board; obtaining the flatness detection result of target building board based on the feature points; installing building boards based on the flatness detection result and local optimal algorithm. The above means enable the successful installation without collaboration of multiple people and based on visual inspection, but instead determining an accurate installation posture through calculation, thereby achieving high efficiency and installation accuracy. In addition, the flatness detection result of target building boards is obtained based on the feature points, the building boards are installed based on the flatness detection result and local optimal algorithms, free from frequent review of the height and angle of each building board, so that it is easy to level the installation of building boards and meet the overall requirements in terms of installation height and large surface levelness.

In an optional embodiment, in S203, obtaining the flatness detection result of target building board based on the feature points, including:

S2031, determining the evaluation parameters for overall height difference between the target building board and the ideal installation plane, based on the feature points;

In an optional embodiment, the step of obtaining ideal installation plane includes:

Step a1, determining a calibration board; wherein the calibration board is the first building board installed;

Step a2, obtaining the second operation image of the area where the calibration board is located; identifying the second operation image to obtain the feature points of the calibration board;

Step a3, determining the ideal installation plane based on the feature points of the calibration board;

Wherein, in Step a1, the first building board installed is defined as a calibration board, and the installation of calibration board is completed by a robot, and the posture of calibration board is adjusted to ensure the compliance of installation flatness with design requirements. Optionally, the first building board must accurately meet the height and levelness requirements for installation, or can be manually installed.

As mentioned above, the feature points can be the coordinates of four corner points $Q_1$, $Q_2$, $Q_3$, and $Q_4$ of the building board. Based on the three-dimensional coordinates of four corner points, the least squares method is used to fit the least squares plane $P_i$, which is considered as the current plane of the calibration board and the ideal installation plane of building board. The expression for $P_i$ is set to $A_ix+B_iy+C_iz+D_i=0$, and its unit normal vector is $$n_i = \frac{(A, B, C)}{\sqrt{A^2 + B^2 + C^2}}.$$

The subscript i in this paragraph represents the i-th building board in the current installation process. The expression of the least squares plane $P_i$ and the unit normal vector $n_i$ of each building board during the installation process are recorded in the system (such as control box 104).

In Step a2, obtaining the second operation image of the area where the calibration board is located, and performing image denoising, image enhancement, and image segmentation on the second operation image to complete image preprocessing for better identification and detection of building boards. The contour of building boards is identified by using edge detection algorithm and contour approximation method, and the three-dimensional coordinates of as many feature points as possible on the building boards are extracted. Optionally, the three-dimensional coordinates of the extracted feature points include the three-dimensional coordinates of four corner points of the building board.

In Step a3, based on the three-dimensional coordinates of four corner points $Q_1$, $Q_2$, $Q_3$, and $Q_4$ of building board extracted in Step a2, the least squares method is used to fit the least squares plane $P_i$, which is considered as the current plane of calibration panel and the ideal installation plane of building board. The expression for $P_i$ is set to $A_ix+B_iy+C_iz+D_i=0$.

In an optional embodiment, the evaluation parameters of overall height difference between target building board and ideal installation plane can be calculated using the following method. Specifically, determining the distance between the target building board and the ideal installation plane based on the feature points, and using the distance as the evaluation parameters of overall height difference; wherein the feature points include the coordinate of the center point of target building board. For convenience of understanding, illustration is made based on an example: based on the feature points $Q_{1,2,\ldots,n}$ (in this embodiment, preferably the three-dimensional coordinates of four corner points $Q_1$, $Q_2$, $Q_3$, and $Q_4$) described above, the distance $d_{1,2,\ldots,n}$ between the feature points and the ideal installation plane $P_i$ is determined according to the formula for point-plane distance calculation. If the maximum allowable height difference for the installation of building boards specified in the construction technical documents is $d_{max}>d_{1,2,\ldots,n}$, it is considered that the evaluation parameters for the overall height difference between the target building board and the ideal installation plane meet the requirements of Step S2031, and the next step of judgment can be carried out; otherwise, the evaluation parameters for the overall height difference between the target building board and the ideal installation plane are considered to not meet the requirements of Step S2031, and the target building board needs to be adjusted.

Step 2032, determining the evaluation parameters of local flatness for the target building board and the plane of local reference building board, based on the feature points.

In an optional embodiment, based on the feature points, an included angle $\Delta\theta_{i-n_j}$ between the target building board and the plane of local reference building board (also known as the plane of adjacent installed building board) is determined, and the angle is used as the evaluation parameter of local flatness.

In the embodiments of the present invention, the included angle $\Delta\theta_{i-n_j}$ between the target building board and the ideal installation plane and plane of local reference building board is calculated as the evaluation parameter for the local flatness of target building board.

Wherein, the plane of local reference building board (also known as the plane of adjacent installed building board) includes: a plane formed by building boards that are installed earlier than the target building board and connected to the common vertex or common edge of target building board. Subscript i represents the i-th building board, which here indicates the target building board. $n_j$ represents the building board adjacent to the target building board, $\Delta\theta_{i-n_j}$ is the included angle between the target building board and the building board with serial number $n_j$. After calculating the included angle between the target building board and each numbered building board, determine the maximum angle and use the maximum angle as an evaluation parameter for local flatness.

Step 2033, obtaining the flatness detection result of target building board, based on the evaluation parameters of overall height difference and the evaluation parameters of local flatness.

In an optional embodiment, the flatness detection result is determined to be a flatness result if the evaluation parameters of overall height difference is less than the preset distance threshold, and the evaluation parameters of local flatness is less than the preset angle threshold; the flatness detection result is determined to be a non-flatness result if the evaluation parameters of overall height difference is greater than or equal to the preset distance threshold, and/or the evaluation parameters of local flatness is greater than or equal to the preset angle threshold.

In an optional embodiment, determine the posture correction amount and height correction amount of target building board according to local optimal algorithm when the flatness detection result is a non-flatness result; based on the posture correction amount and height correction amount, perform posture correction and height correction on the target building board, and return to the step of obtaining the first operation image of target building board; determine the installation posture and installation height of the next building board using a local optimal algorithm based on inverse distance weighting interpolation, when the flatness detection result is a flatness result; install the next building board according to the installation posture and installation height.

Figure 4:
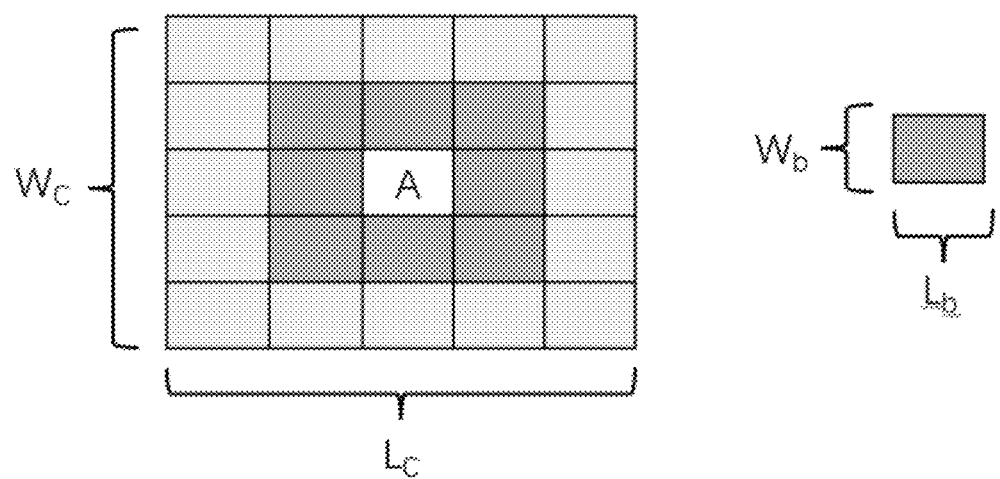
FIG. 4 is a schematic diagram of a partial plane of reference building board in one embodiment.

In an optional embodiment, before determining the installation posture and height of the next building board, using a local optimal algorithm based on inverse distance weighting interpolation, the number of cladding layers needs to be determined, and the plane of local reference building board is determined based on the number of cladding layers and, specifically:

As shown in FIG. 3, taking the center point A of target building board (essentially the target building board) as the center, based on the adjacency spatial dependency relationship, the relationship between A and C1, C2, C3, C4 is called a common vertex connection, the relationship between A and B1, B2, D1, D2 is called a common edge connection, and the relationship between A and C1, C2, C3, C4, B1, B2, D1, D2 is called a common vertex and common edge connection (i.e. Queen connection). As shown in FIG. 4, taking A as the target building board, based on the spatial weight matrix Queen connection theory, considering the size of a single building board, taking A as the center, the area around A within a certain range is taken as the distribution area of the building board that needs to be referred to for local flatness detection (i.e., the plane of local reference building board).

The specific implementation method is as follows: The evaluation basis for local flatness is the area centered on A, with a length of $L_C$ and a width of $W_C$. The length and width of a single building board are $L_b$ and $W_b$, respectively. Building boards are generally rectangular in shape. Assuming that $\sigma L$ and $\sigma W$ are the number of cladding layers in the $L_C$ and $W_C$ directions, respectively, then $\sigma L=(L_C-L_b)/2L_b$ (rounded), and $\sigma W=(W_C-W_b)/2W_b$ (rounded). Based on this, the horizontal and vertical cladding layers of plane of local reference building board is determined, and the plane of local reference building board is further determined.

In an optional embodiment, determine the installation posture and installation height of the next building board using a local optimal algorithm based on inverse distance weighting interpolation, when the flatness detection result is a flatness result, including: determining the posture of local reference building board in the plane of local reference building board; determining the weight coefficient of each local reference building board based on the distance between the center point of target building board and the center point of next building board; determining the installation posture of the next building board, based on the posture of each local reference building board and the weight coefficient, specifically:

Determine the plane of local reference building board based on the calculated number of cladding layers; determine the weight coefficients of each local reference building board in the plane of local reference building board; read (or remeasure) the height and posture data of the local reference building board mentioned above, and calculate the installation posture and height of the next building board (also known as the theoretical installation position) according to the local optimal algorithm.

In addition to obtaining the installation posture and height of the next building board (also known as the theoretical installation position), the center point coordinate representation and the normal vector representation of theoretical installation position can also be obtained. Let the center point coordinate of theoretical installation position be A=(xa, ya, za), and the normal vector of theoretical installation position be nA=(Aa, Ba, Ca). Taking the theoretical installation position of the next building board as the center, according to the method in Step S1032, determine the distribution area of the building board that needs to be referenced near the theoretical installation position of the next building board (i.e., the plane of local reference building board), and identify the installed building boards within the plane of local reference building board. Extract the three-dimensional coordinates Xi=(xi, yi, zi) and normal vector nXi=(Ai, Bi, Ci) of the center point of each building board.

As the installation flatness of building boards is mainly related to the height and roof angle, the center point of building boards and the coordinate value error of theoretical installation position on the axis x and y have a small impact on the installation quality. For the center point coordinate A=(xa, ya, za) of the theoretical installation position, the error between the actual installation position and the center coordinate, xa and ya, of theoretical installation position do not affect the installation quality.

Therefore, the zi and normal vector nXi in the center point coordinate of each building board are taken as the attribute values of building board (see relevant discussion below). Calculate the distance between the center point of each building board in the plane of local reference building board and the center point of theoretical installation position of the next building board. Based on the inverse distance weighting interpolation method described below, and the distance conversion, calculate the weight influence factor and determine the installation posture and height of the next building board (i.e., the instructive installation posture and height).

In the embodiments of the present invention, there is one horizontal wrapping layer and one vertical wrapping layer, that is, for the next building board A to be installed, the already installed boards in B1, B2, D1, D2, C1, C2, C3, and C4 in FIG. 3 are used as local reference building boards (those boards that have not been installed yet, even if they will be installed later, will no longer be included in the algorithm calculation and building board A will no longer be adjusted).

The local optimal algorithm proposed by the present invention can be used to calculate the installation height and posture of the next building board. The posture of building boards is represented by their unit normal vectors. The calculation formula is as follows:

$$Z_A = \frac{\sum_{r=1}^{j} k_r * Z_r}{\sum_{r=1}^{j} k_r},$$

where: $Z_A$ is the installation height of the next building board (that is, board A in FIG. 3); j is the quantity of local reference building boards; r is the number of local reference building board; $Z_r$ is the installation height of the rth local reference building board recorded previously; $k_r$ is the weight coefficient of the rth local reference building board;

It should be noted that the local optimal algorithm proposed by the present invention does not calculate the installation position of the next building board in the horizontal plane (i.e., the coordinate in the horizontal XOY plane), but installs each building board in a manner of vertical and horizontal alignment, dense splicing and full laying, thereby determining the values of X and Y coordinate.

$$n_A = \frac{\sum_{r=1}^{r} k_r * n_r}{\sum_{r=1}^{j} k_r}.$$

Wherein: $n_A$ is the unit normal vector of the installation of the next building board (that is, board A in FIG. 3); j is the quantity of local reference building boards; r is the number of local reference building board; $n_r$ is the unit normal vector of the rth local reference building board recorded previously; $k_r$ is the weight coefficient of the rth local reference building board;

In this embodiment, the inverse distance weighting method is used to determine the weight coefficient of each local reference building board, that is, the reciprocal of the distance between the center point of a certain local reference building board and the center point of the installation position of next building board is used as its weight coefficient.

The calculation formula is as follows:

$$k_r = \left| \frac{1}{d_{O_r-O_A}} \right|,$$

where $k_r$ is the weight coefficient of the rth local reference building board, and $d_{O_r-O_A}$ is the distance between points $O_r$ and $O_A$ on the horizontal XOY plane. $O_r$ is the center point of the r-th local reference building board, $O_A$ is the center point of the next building board (i.e. building board A shown in FIG. 3). Both $O_A$ and $O_r$ can be obtained by calculating the average of coordinates of four corner points $Q_1$, $Q_2$, $Q_3$, and $Q_4$ of the building board extracted in Step a2 of S2031.

The above formula can be used to calculate the installation height and posture of the next building board. Install building boards based on the installation height and posture of the next building board.

After the installation of the next building board is completed, the center point and plane normal vector of the installed building board are extracted, and the difference with the instructive installation posture is used to obtain the posture correction amount and height correction amount. The posture correction and height correction are used as inputs to convert into control signals for the robot to complete the installation correction of building boards after installation.

Determine the posture correction amount and height correction amount of target building board according to local optimal algorithm when the flatness detection result is a non-flatness result; based on the posture correction amount and height correction amount, the relevant content of posture correction and height correction for the target building board is the same as the correction mentioned above, which will not be detailed here.

The inverse distance weighting method, a commonly used spatial interpolation method, can calculate unknown points based on the attribute values of known points. The attribute value of an unknown point is equal to the weighted average of the attribute value of a known point and the reciprocal of distance. The closer the distance, the greater the weight corresponding to the point, and the farther the distance, the smaller the weight corresponding to the point. As shown in FIG. 3, assuming ABCD are respectively the centers of the squares they are in, and given that the attribute values at BCD are x (Xi) and d (A-Xi), the distances from A to Xi, where, i=1, 2, 3 . . . . X=B, C, D. The inverse distance weighting method takes the reciprocal 1/d (A-Xi) of the distance between Xi and A as the weight coefficient of Xi to A. The attribute value x (A) at A can be expressed as (the sum of the weight coefficient at BCD and the product of attribute values, divided by the sum of the weight coefficient at BCD).

In the embodiments of the present invention, a machine vision based building board installation method can be used to detect the installation flatness (also known as quality of installation flatness) of building boards, and can output posture correction and height correction values, or output instructive installation posture and height of the next building board to assist robots in calibration and/or installation. Thus, a quality control loop, including "installation-visual quality inspection-local optimal installation posture and height guidance", is formed in the installation process of building boards, effectively ensuring and improving the installation quality of roof building boards. In addition, the inverse distance weighting method is used, the reciprocal of the distance between the center point of theoretical installation position of the next building board and the center point of surrounding installed building boards (the center point of each building board in the plane of local reference building boards) is used as a weight. Based on with the posture and height of each local reference building board in the plane of local reference building board, the local optimal guidance installation posture and height of the next building board are obtained to assist in the installation of building boards and ensure the local installation flatness of building boards.

It should be understood that the steps in the flowchart of FIG. 2, although displayed in the order indicated by the arrows, are not necessarily executed in the order indicated by the arrows. Unless otherwise specified in this article, there is no strict limit for the execution order of these steps, and they can be executed in other orders. Moreover, at least some of the steps in FIG. 2 may include multiple steps or stages, which are not necessarily completed at the same time, but can be executed at different times. These steps or stages are not necessarily executed in sequential order, but can be rotated or alternated with other steps, or with at least a part of other steps or stages.

Figure 5:
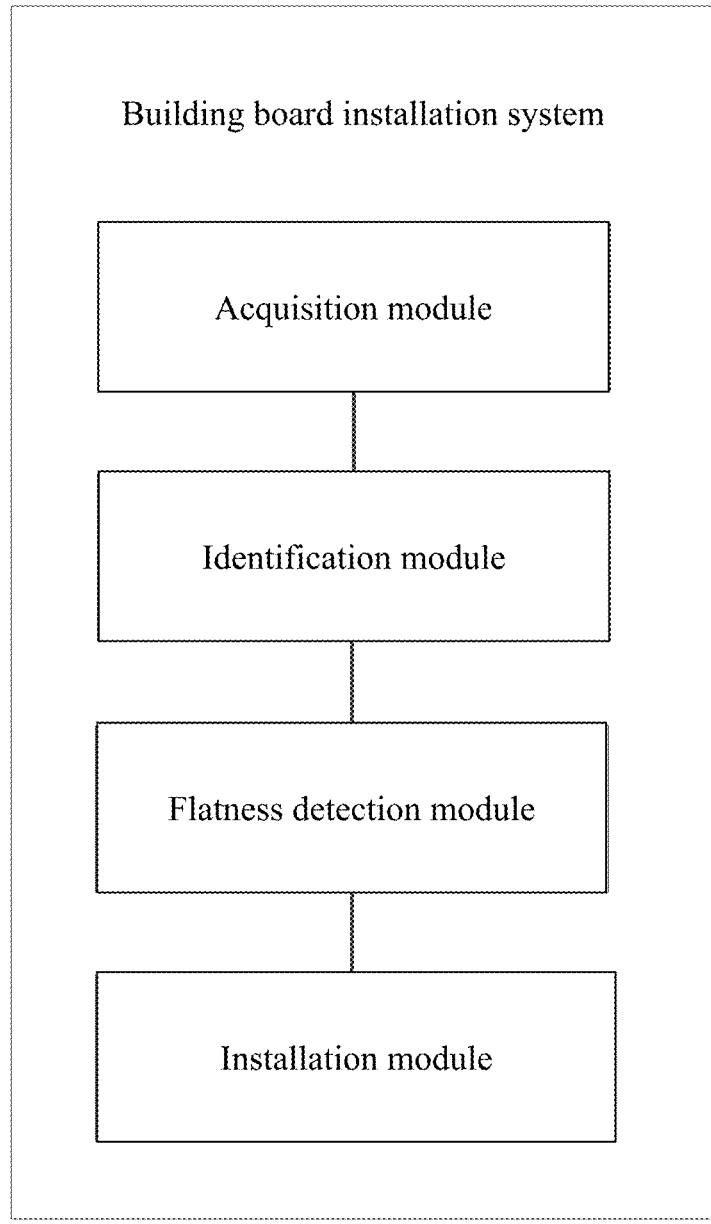
FIG. 5 is a structural diagram of a machine vision based installation system for building board in one embodiment.

In one embodiment, as shown in FIG. 5, a machine vision based building board installation system, comprising:
an acquisition module, used to obtain the first operation image of target building board; the target building board is a current newly installed building board;
an identification module, used to identify the first operation image and obtain the feature points of target building board;
a flatness detection module, used to obtain the flatness detection result of target building board based on the feature points; and
an installation module, used to install building boards based on the flatness detection result and local optimal algorithm;

In an optional embodiment, the flatness detection module is used for:
determining the evaluation parameters of overall height difference between the target building board and the ideal installation plane, based on the feature points;
determining the evaluation parameters of local flatness for the target building board and the plane of local reference building board, based on the feature points;
obtaining the flatness detection result of target building board, based on the evaluation parameters of overall height difference and the evaluation parameters of local flatness;

In an optional embodiment, the building board installation system further comprises an ideal installation plane acquisition module for:
determining a calibration board; the calibration board is the first building board installed;
obtaining the second operation image of the area where the calibration board is located;
identifying the second operation image and obtaining the feature points of the calibration board;
determining the ideal installation plane based on the feature points of the calibration board;

In an optional embodiment, the flatness detection module is used for:
determining the maximum distance between the target building board and the ideal installation plane based on the feature points, and using the maximum distance as the evaluation parameters of overall height difference; the feature points include the coordinate of the corner point of target building board;
or
determining the distance between the target building board and the ideal installation plane based on the feature points, and using the distance as the evaluation parameters of overall height difference; the feature points include the coordinate of the center point of target building board;

In an optional embodiment, the flatness detection module is used for:
determining the included angle between the target building board and the plane of local reference building board based on the feature points, and using the angle as the evaluation parameters of local flatness;

In an optional embodiment, the building board installation system further comprises a local reference building board plane acquisition module for:

determining the local reference building board plane with the target building board as the center, based on the spatial weight matrix.

In an optional embodiment, the flatness detection module is used for:

the flatness detection result is determined to be a flatness result if the evaluation parameters of overall height difference is less than the preset distance threshold, and the evaluation parameters of local flatness is less than the preset angle threshold;

the flatness detection result is determined to be a non-flatness result if the evaluation parameters of overall height difference is greater than or equal to the preset distance threshold, and/or the evaluation parameters of local flatness is greater than or equal to the preset angle threshold.

In an optional embodiment, the installation module is used for:

determining the posture correction amount and height correction amount of target building board according to local optimal algorithm when the flatness detection result is a non-flatness result;

performing posture correction and height correction on the target building board, and returning to the step of obtaining the first operation image of target building board, based on the posture correction amount and height correction amount;

determining the installation posture and installation height of the next building board using a local optimal algorithm based on inverse distance weighting interpolation, when the flatness detection result is a flatness result;

installing the next building board according to the installation posture and installation height.

In an optional embodiment, the installation module is used for:

determining the posture of local reference building board in the plane of local reference building board;

determining the weight coefficient of local reference building board based on the distance between the center point of target building board and the center point of next building board;

determining the installation posture of the next building board, based on the posture of local reference building board and the weight coefficient.

The relevant descriptions and method embodiments of the above installation board installation system are consistent and will not be elaborated here.

Figure 6:
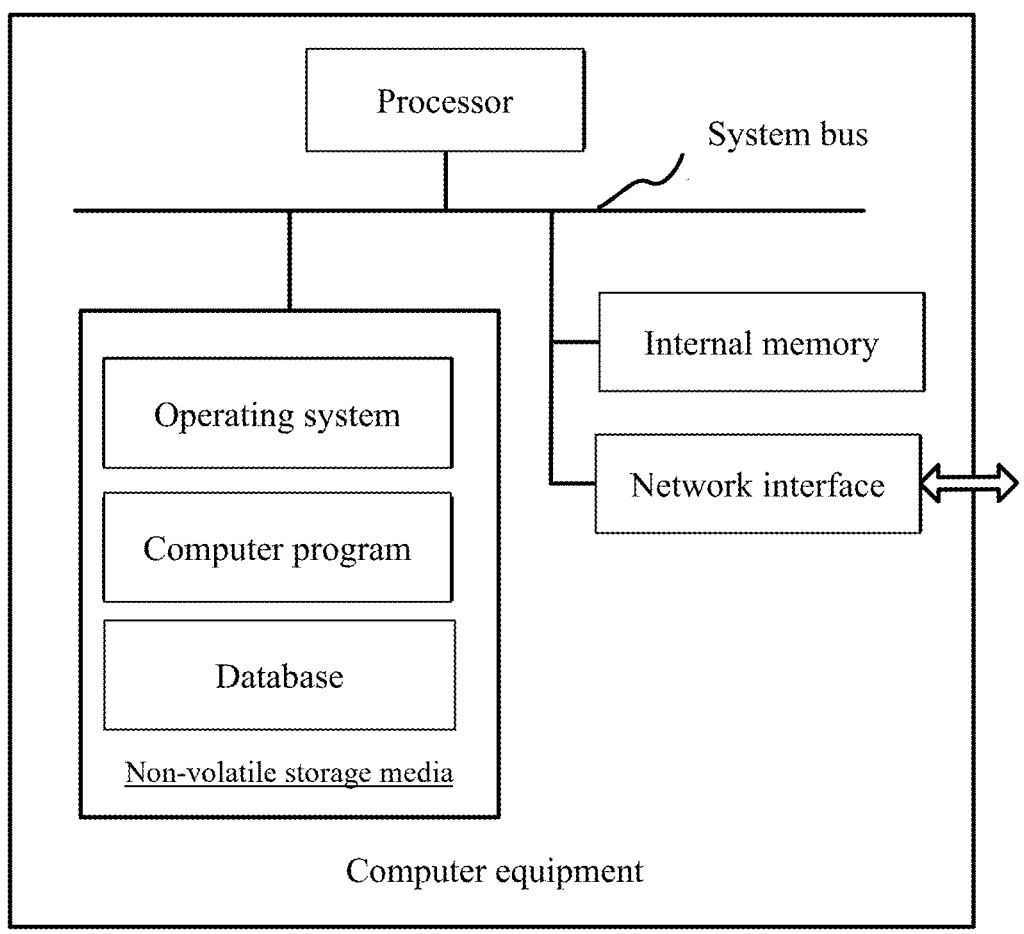
FIG. 6 is an internal structural diagram of a computer equipment in one embodiment.

In one embodiment, a computer equipment is provided, which may be a server, and its internal structure diagram may be as shown in FIG. 6. The computer equipment includes a processor, a memory, network interface, and database connected through a system bus. The processor of computer equipment is used to provide computing and control capabilities. The memory of computer equipment includes non-volatile storage media and internal memory. The non-volatile storage medium stores operating systems, computer programs, and databases. The internal memory provides an operating environment for operating systems and computer programs in non-volatile storage media. The database of this computer equipment is used to store data. The network interface of this computer equipment is used to communicate with external terminals through a network connection. The computer program is executed by a processor to implement a machine vision based building board installation method.

Person having ordinary skill in the art can understand that the structure shown in FIG. 6 is only a block diagram of a part of the structure related to the present application, and does not constitute a limitation on the computer equipment to which the present application is applied. Specific computer equipment may include more or fewer components than shown in the figure, or combine certain components, or have different component arrangements.

In one embodiment, a computer-readable storage medium is provided, on which a computer program is stored, and when the computer program is executed by a processor, the steps of machine vision based building board installation method described in any of the above embodiments are implemented.

Those of ordinary skill in the art can understand that all or part of the processes in the above embodiments can be accomplished by relevant hardware under the instruction of a computer program. The computer program can be stored in a non-volatile computer-readable storage medium, and when executed, it can include the processes of the embodiments of the above methods. Any reference to memory, storage, database or other media used in the embodiments provided in the present application may include non-volatile and/or volatile memory. Non-volatile memory can include read-only memory (ROM), programmable ROM (PROM), electrically programmable ROM (EPROM), electrically erasable programmable ROM (EEPROM), or flash memory. Volatile memory can include random access memory (RAM) or external cache memory. As an illustration and not a limitation, RAM can be obtained in various forms, such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), Rambus direct RAM (RDRAM), direct Rambus dynamic RAM (DRDRAM), and Rambus dynamic RAM (RDRAM).

The various technical features of the above embodiments can be combined arbitrarily and, in order to make the description concise, not all possible combinations of the various technical features in the above embodiments have been described. As long as there is no contradiction, however, the combination of these technical features should be considered within the scope of the specification.

The above embodiments only express several embodiments of the present application, and their descriptions are more specific and detailed, but should not be understood as limiting the scope of the invention patent. It should be noted that those of ordinary skill in the art can make several modifications and improvements without departing from the concept of the present application, which are within the scope of protection of the present application. Therefore, the scope of protection of the present patent application should be based on the attached claims.

What is claimed is:

1. A machine vision based installation method for building boards, wherein the machine vision based installation method for building boards comprises:

obtaining a first operation image of a target building board; the target building board is a current newly installed building board;

identifying the first operation image and obtaining feature points of the target building board;

obtaining a flatness detection result of the target building board based on the feature points; the flatness detection results comprise flatness result and non-flatness result;

installing building boards based on the flatness detection result and a local optimal algorithm;

the installation of building boards comprises the adjustable installation of target building board and the installation of next building board;

calculating an installation height and posture of the next building board based on the local optimal algorithm;

the posture of building boards is represented by unit normal vectors, and the calculation formula is as follows:

$$Z_A = \frac{\sum_{r=1}^{j} k_r * Z_r}{\sum_{r=1}^{j} k_r},$$

where $Z_A$ is the installation height of the next building board; j is the quantity of local reference building boards; r is the number of local reference building board; $Z_r$ is the installation height of the rth local reference building board recorded previously; $k_r$ is the weight coefficient of the rth local reference building board;

$$n_A = \frac{\sum_{r=1}^{r} k_r * n_r}{\sum_{r=1}^{j} k_r},$$

where $n_A$ is the unit normal vector of the installation of the next building board; j is the quantity of local reference building boards; r is the number of local reference building board; $n_r$ is the unit normal vector of the rth local reference building board recorded previously; $k_r$ is the weight coefficient of the rth local reference building board;

obtaining the flatness detection result of target building board based on the feature points comprises:

determining the evaluation parameters of overall height difference between the target building board and the ideal installation plane, based on the feature points;

determining the evaluation parameters of local flatness for the target building board and the plane of local reference building board, based on the feature points; the plane of local reference building board comprises: a plane formed by building boards that are installed earlier than the target building board and connected to the common vertex or common edge of target building board; the local reference building board is the building board in the plane of local reference building board;

obtaining the flatness detection result of target building board, based on the evaluation parameters of overall height difference and the evaluation parameters of local flatness; the step of obtaining ideal installation plane comprises: determining a calibration board; the calibration board is the first building board installed; obtaining the second operation image of the area where the calibration board is located; identifying the second operation image and obtaining the feature points of the calibration board; determining the ideal installation plane based on the feature points of the calibration board;

determining the evaluation parameters of overall height difference between the target building board and the ideal installation plane based on the feature points comprises:

determining the distance between the target building board and the ideal installation plane based on the feature points, and using the distance as the evaluation parameters of overall height difference; the feature points comprise the coordinate of the center point of target building board;

determining the evaluation parameters of local flatness of target building board and plane of local reference building board based on the feature points, comprises:

determining the included angle between the target building board and the plane of local reference building board based on the feature points, and using the angle as the evaluation parameters of local flatness;

obtaining flatness detection result of target building board based on the evaluation parameters of overall height difference and the evaluation parameters of local flatness comprises:

the flatness detection result is determined to be a flatness result if the evaluation parameters of overall height difference is less than the preset distance threshold, and the evaluation parameters of local flatness is less than the preset angle threshold;

the flatness detection result is determined to be a non-flatness result if the evaluation parameters of overall height difference is greater than or equal to the preset distance threshold, and/or the evaluation parameters of local flatness is greater than or equal to the preset angle threshold.

2. The machine vision based installation method for building boards of claim 1, wherein the installation of building boards based on the flatness detection result and local optimal algorithm comprises:

determining the posture correction amount and height correction amount of target building board according to local optimal algorithm when the flatness detection result is a non-flatness result;

based on the posture correction amount and height correction amount, performing posture correction and height correction on the target building board, and returning to the step of obtaining the first operation image of target building board;

determining the installation posture and installation height of the next building board using a local optimal algorithm based on inverse distance weighting interpolation, when the flatness detection result is a flatness result;

installing the next building board according to the installation posture and installation height.

3. The machine vision based installation method for building boards of claim 2, wherein determining the installation posture and installation height of the next building board using the local optimal algorithm method based on inverse distance weighting interpolation, comprising:

determining the posture of local reference building board in the plane of local reference building board;

determining the weight coefficient of local reference building board based on the distance between the center point of target building board and the center point of next building board;

determining the installation posture of the next building board, based on the posture of local reference building board and the weight coefficient.

4. A vision system, comprising:
a memory;
a processor configured to execute instructions stored in the memory and causing the processor to:
obtain a first operation image of a target building board; the target building board is a current newly installed building board;
identify the first operation image and obtain the feature points of the target building board;
obtain a flatness detection result of the target building board based on the feature points; the flatness detection result comprises flatness result and non-flatness result;
install building boards based on the flatness detection result and a local optimal algorithm;
the installation of building boards comprises adjustable installation of target building board and installation of next building board;
calculate an installation height and posture of the next building board based on the local optimal algorithm, wherein $$Z_A = \frac{\sum_{r=1}^{j} k_r * Z_r}{\sum_{r=1}^{j} k_r},$$

where $Z_A$ is the installation height of the next building board; j is the quantity of local reference building boards; r is the number of local reference building board; $Z_r$ is the installation height of the rth local reference building board recorded previously; $k_r$ is the weight coefficient of the rth local reference building board;

$$n_A = \frac{\sum_{r=1}^{r} k_r * n_r}{\sum_{r=1}^{j} k_r},$$

where $n_A$ is the unit normal vector of the installation of the next building board; j is the quantity of local reference building boards; r is the number of local reference building board; $n_r$ is the unit normal vector of the rth local reference building board recorded previously; $k_r$ is the weight coefficient of the rth local reference building board;
obtaining the flatness detection result of target building board based on the feature points comprises:
determining the evaluation parameters of overall height difference between the target building board and the ideal installation plane, based on the feature points;
determining the evaluation parameters of local flatness for the target building board and the plane of local reference building board, based on the feature points; the plane of local reference building board comprises: a plane formed by building boards that are installed earlier than the target building board and connected to the common vertex or common edge of target building board; the local reference building board is the building board in the plane of local reference building board;
obtain the flatness detection result of target building board, based on the evaluation parameters of overall height difference and the evaluation parameters of local flatness; the step of obtaining ideal installation plane comprises: determining a calibration board; the calibration board is the first building board installed; obtaining the second operation image of the area where the calibration board is located; identifying the second operation image and obtaining the feature points of the calibration board; determining the ideal installation plane based on the feature points of the calibration board;
determining the evaluation parameters of overall height difference between the target building board and the ideal installation plane based on the feature points comprises:
determining the distance between the target building board and the ideal installation plane based on the feature points, and using the distance as the evaluation parameters of overall height difference; the feature points comprise the coordinate of the center point of target building board;
determining the evaluation parameters of local flatness of target building board and plane of local reference building board based on the feature points, comprises:
determining the included angle between the target building board and the plane of local reference building board based on the feature points, and using the angle as the evaluation parameters of local flatness;
obtaining flatness detection result of target building board based on the evaluation parameters of overall height difference and the evaluation parameters of local flatness comprises:
the flatness detection result is determined to be a flatness result if the evaluation parameters of overall height difference is less than the preset distance threshold, and the evaluation parameters of local flatness is less than the preset angle threshold;
the flatness detection result is determined to be a non-flatness result if the evaluation parameters of overall height difference is greater than or equal to the preset distance threshold, and/or the evaluation parameters of local flatness is greater than or equal to the preset angle threshold.

5. A non-transitory computer-readable storage medium storing a computer program, wherein the method of claim 1 is implemented when the computer program is executed by a processor.

* * * * *